(12) United States Patent
Chen

(10) Patent No.: US 6,712,436 B2
(45) Date of Patent: Mar. 30, 2004

(54) COMBINATIONAL DRAWER

(76) Inventor: Chi-Chuan Chen, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/073,768

(22) Filed: Feb. 8, 2002

(65) Prior Publication Data

US 2003/0151338 A1 Aug. 14, 2003

(51) Int. Cl.[7] .............................. A47B 88/00; B65D 8/14
(52) U.S. Cl. ............................ 312/348.1; 312/257.1; 220/4.28; 220/6
(58) Field of Search .................... 312/348.1, 348.2, 312/259.1, 258, 263, 264, 265.1; 220/4.33, 4.28, 6, 4.29; 217/122

(56) References Cited

U.S. PATENT DOCUMENTS

| | | | | |
|---|---|---|---|---|
| 2,806,755 A | * | 9/1957 | Glass | 312/265.4 |
| 4,045,104 A | * | 8/1977 | Peterson | 312/265.4 |
| 4,171,058 A | * | 10/1979 | Collins | 217/12 R |
| 4,279,455 A | * | 7/1981 | Santo | 312/348.2 |
| 4,609,116 A | * | 9/1986 | Simms | 217/12 R |
| 4,782,972 A | * | 11/1988 | Wenkman et al. | 220/4.28 |
| 5,931,326 A | * | 8/1999 | Weng | 220/4.33 |
| 6,230,915 B1 | * | 5/2001 | Liu | 220/6 |

* cited by examiner

Primary Examiner—Anita King

(57) ABSTRACT

A combinational drawer has a rectangular base frame, a first rectangular side frame disposed on the rectangular base frame, a second rectangular side frame disposed on the rectangular base frame, a first rectangular lateral frame disposed on the rectangular base frame, a second rectangular lateral frame disposed on the rectangular base frame, a first U-shaped rod connected to the first rectangular side frame and the second rectangular side frame, and a second U-shape rod connected to the first rectangular side frame anti the second rectangular side frame. A connection fastener has an L-shaped end inserted in the first rectangular lateral frame, a distal end inserted in the rectangular base frame, and a column inserted in the first rectangular side frame.

4 Claims, 8 Drawing Sheets

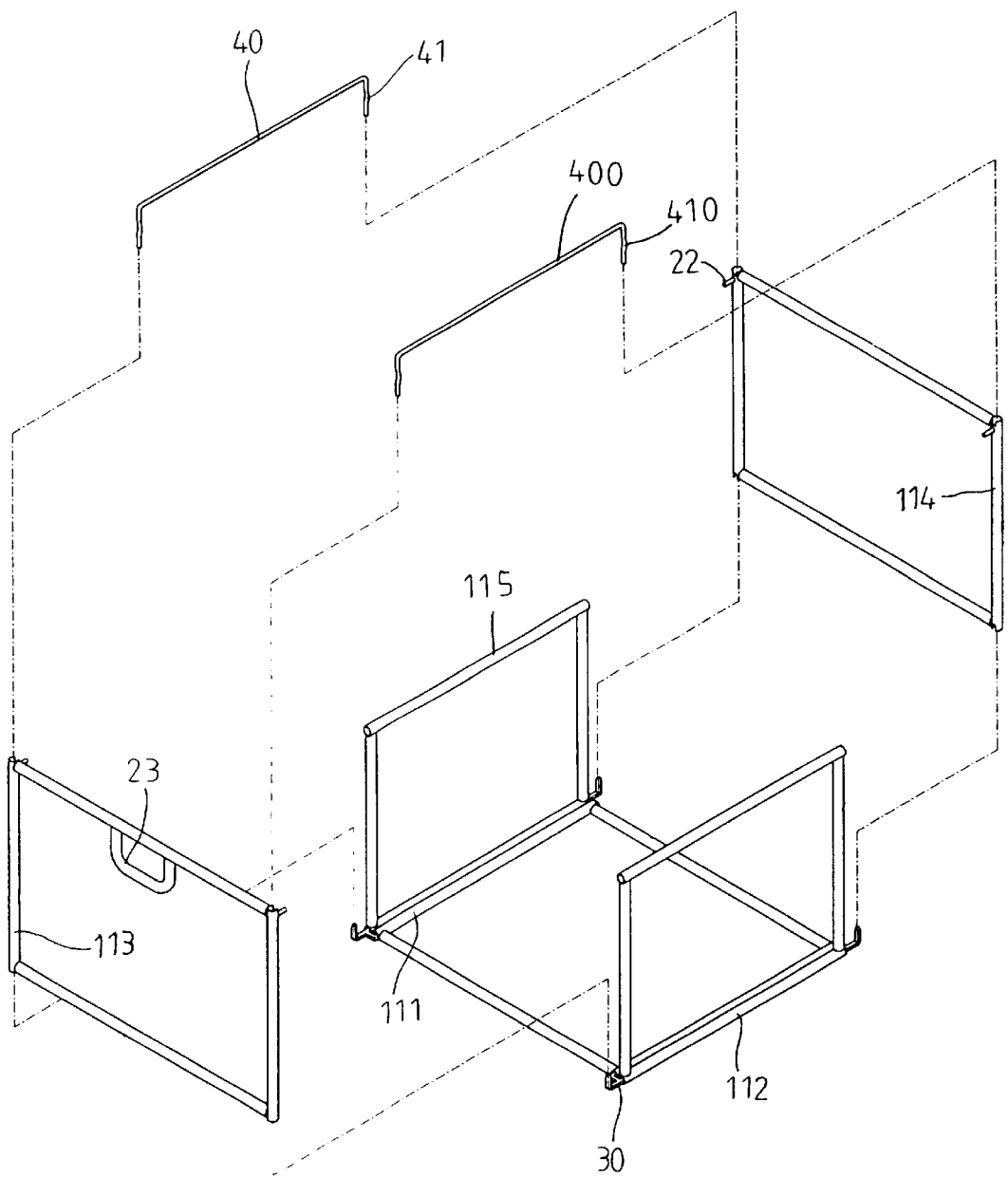
F I G. 1

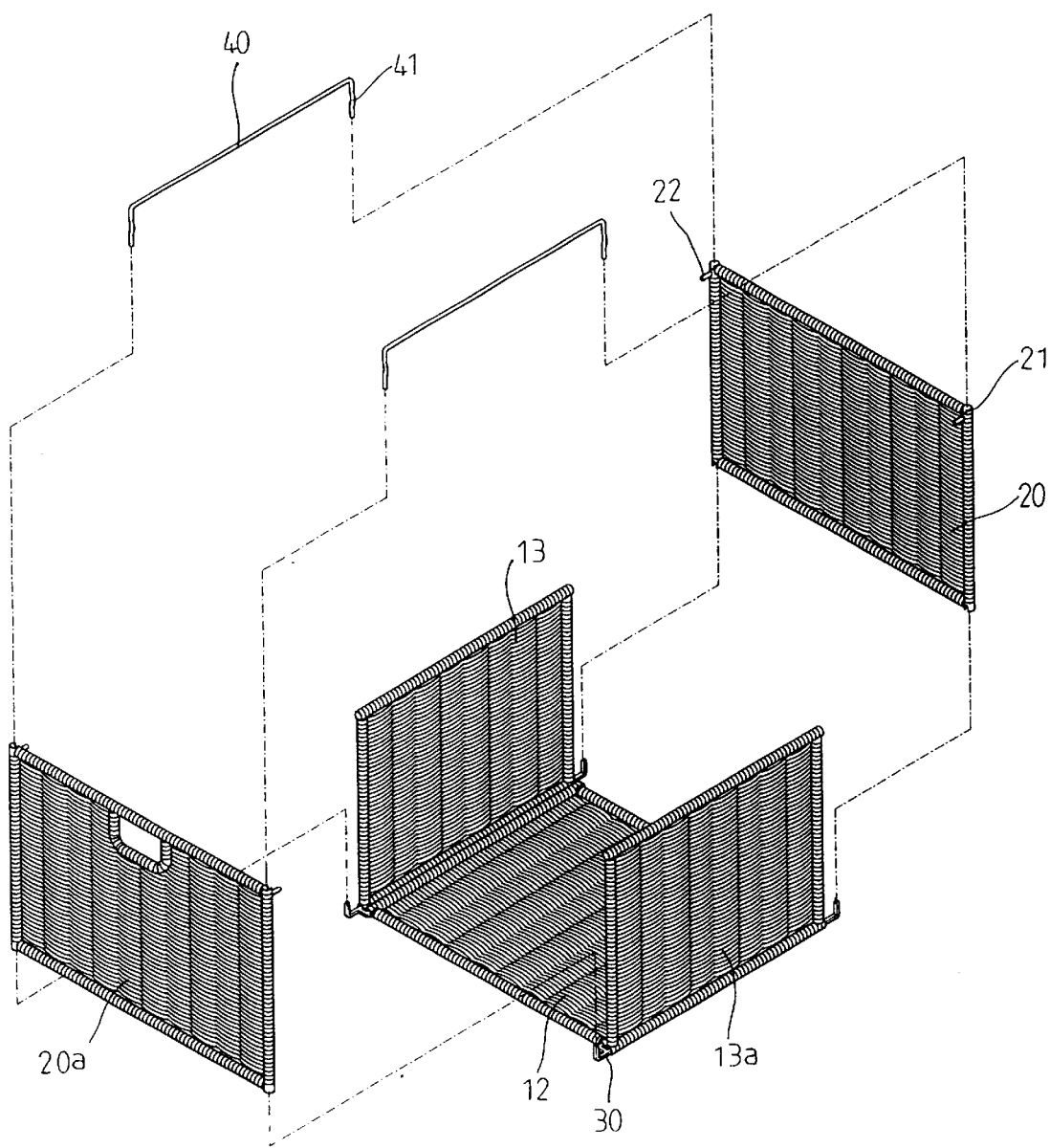
F I G. 2

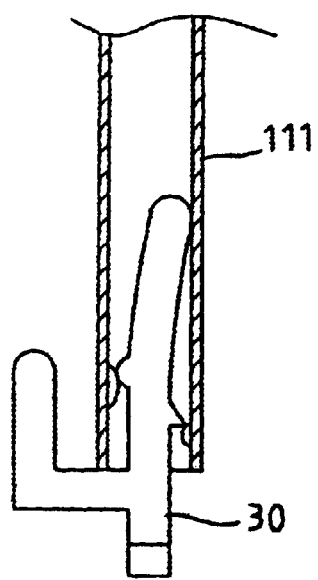
F I G. 4
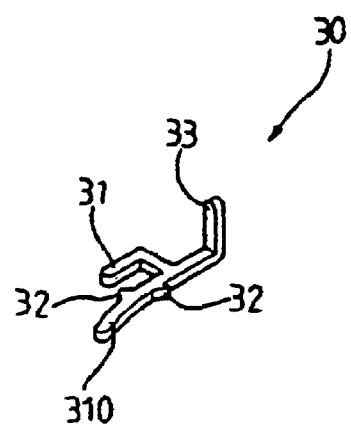
F I G. 5

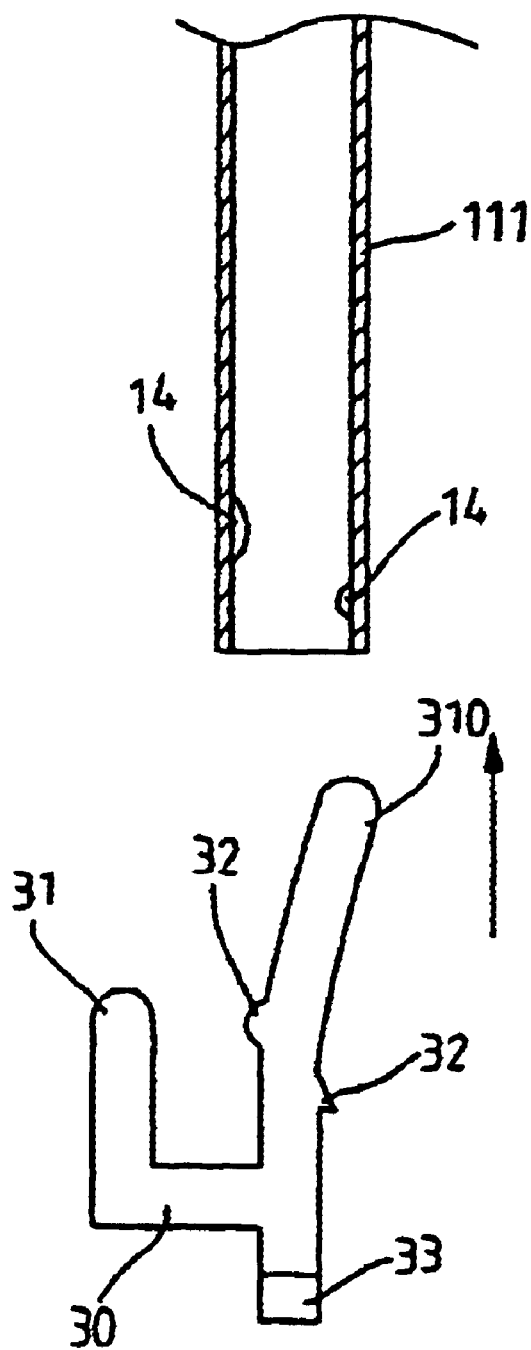
F I G. 6

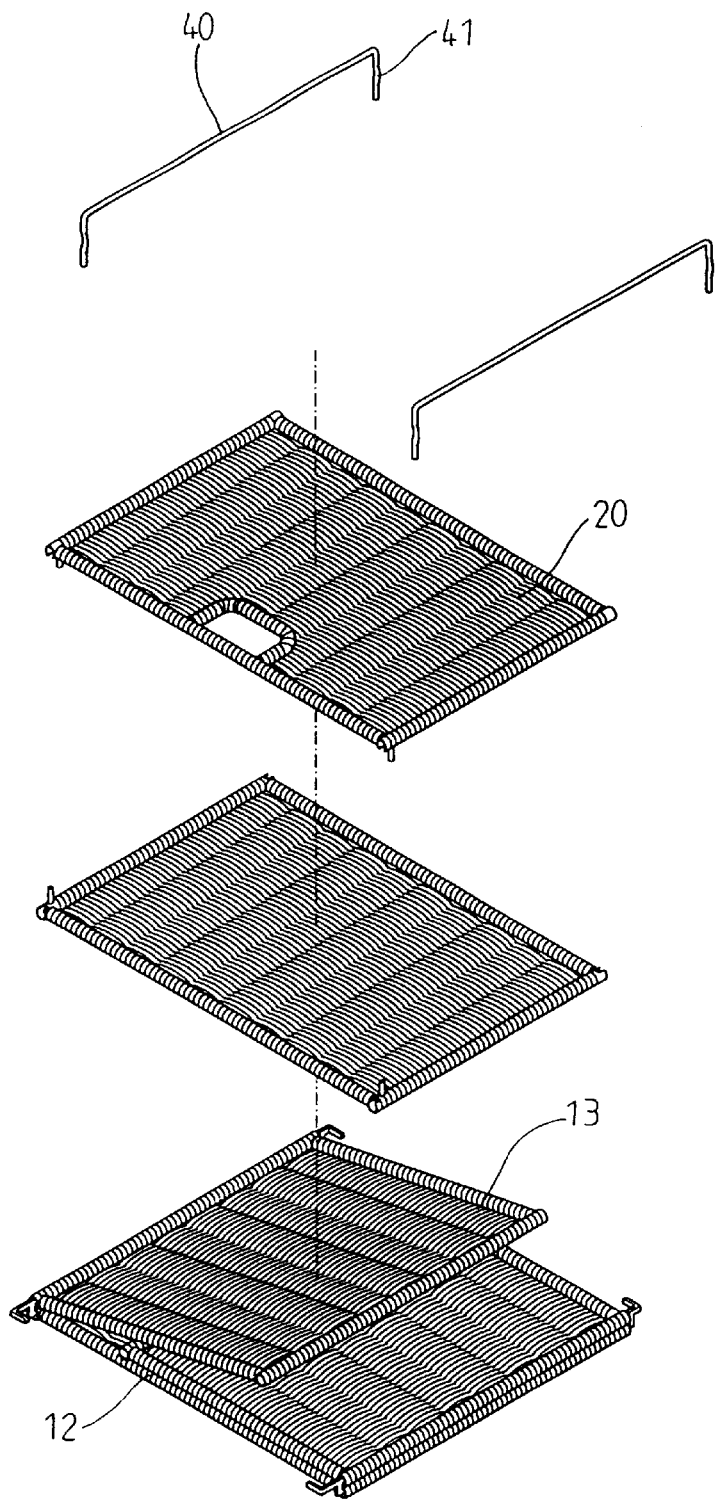
F I G. 8

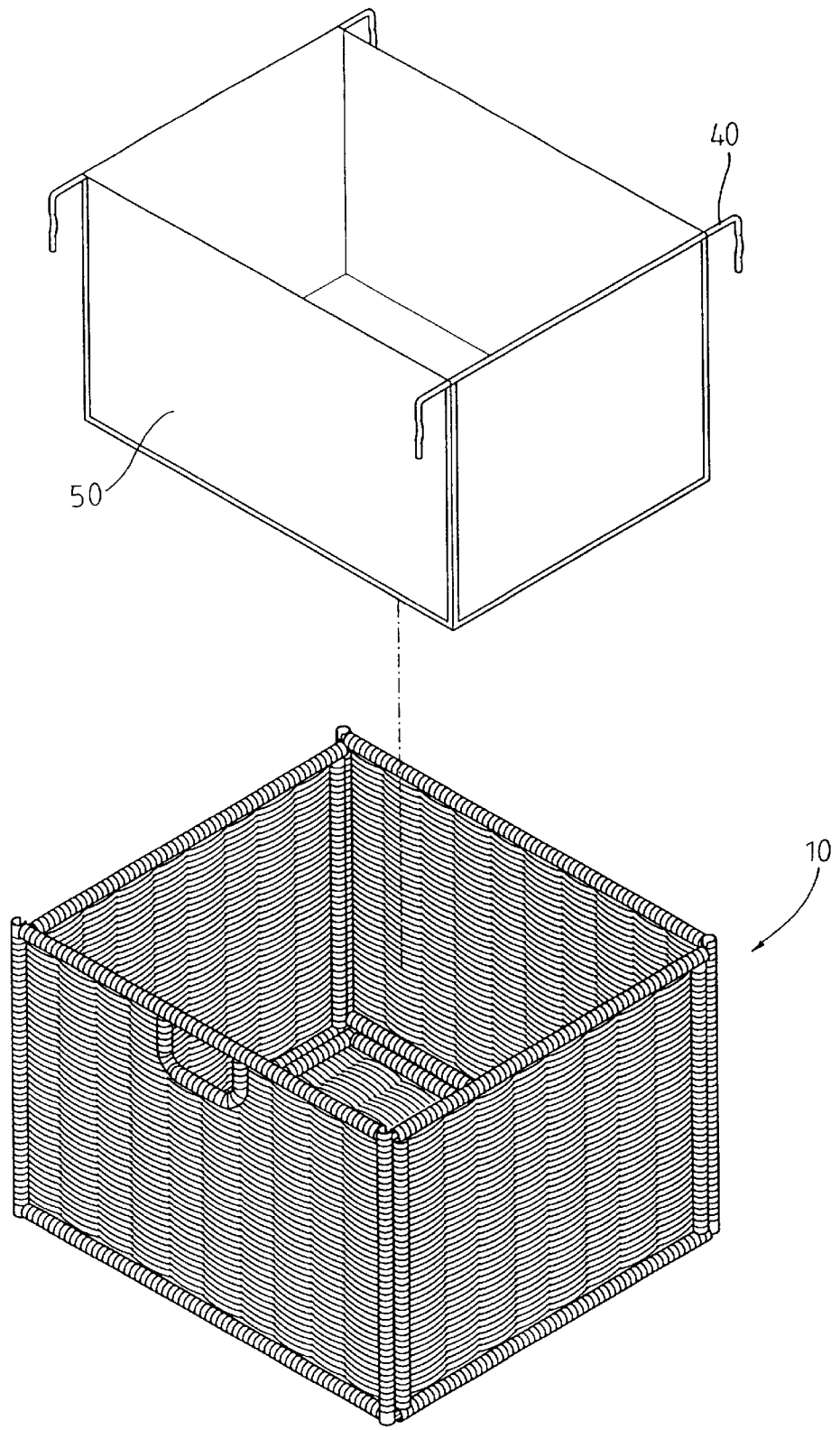
F I G. 9

COMBINATIONAL DRAWER

BACKGROUND OF THE INVENTION

The present invention relates to a combinational drawer. More particularly, the present invention relates to a combinational drawer which is easily assembled.

A conventional drawer cannot be detached by a user.

SUMMARY OF THE INVENTION

An object of the present invention is to provide a combinational drawer which is easily assembled.

Another object of the present invention is to provide a combinational drawer which is easily detached.

BRIEF DESCRIPTION OF THE DRAWINGS

FIGS. 1 is a perspective exploded view of a rectangular base frame, a first rectangular side frame, a second rectangular side frame, a first U-shaped rod, and a second U-shaped rod of a preferred embodiment in accordance with the present invention;

FIG. 2 is a perspective exploded view of a combinational drawer a preferred embodiment in accordance with the present invention;

FIG. 4 is a schematic view illustrating a connection fastener will be inserted in a first rectangular side frame;

FIG. 5 is a schematic view illustrating a connection fastener is inserted in a first rectangular side frame;

FIG. 6 is a perspective view of a connection fastener of a preferred embodiment in accordance with the present invention;

FIG. 8 is another perspective exploded view of a combinational drawer of a preferred embodiment in accordance with the present invention; and FIG. 9 is a perspective view of a combinational drawer of a preferred embodiment with a fabric bag.

DETAILED DESCRIPTION OF THE INVENTION

Figure 3:
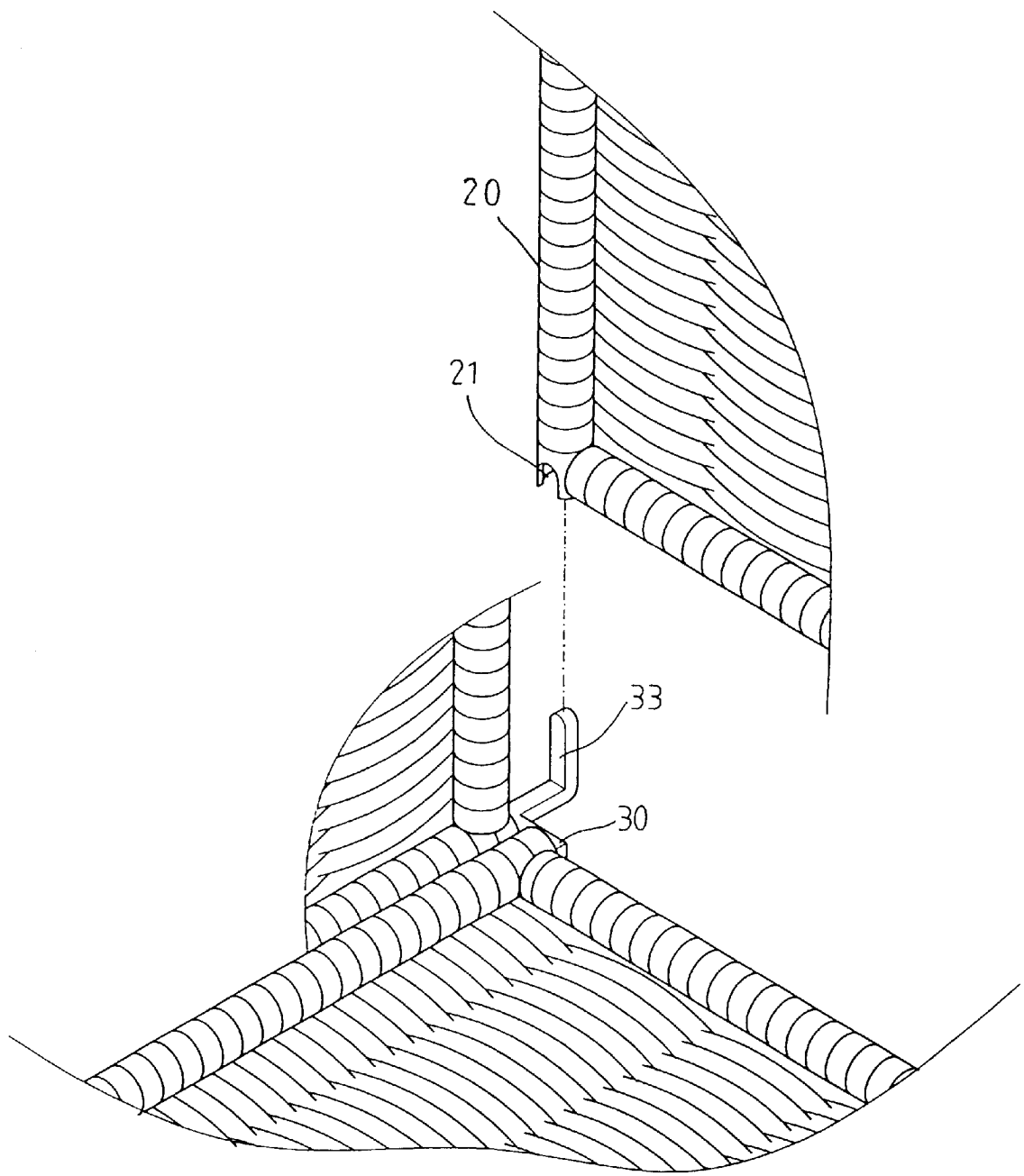
FIG. 3 is a schematic view illustrating a cloumn is inserted in a corner notch of a first side plate of a preferred embodiment in accordance with the present invention.
Figure 7:
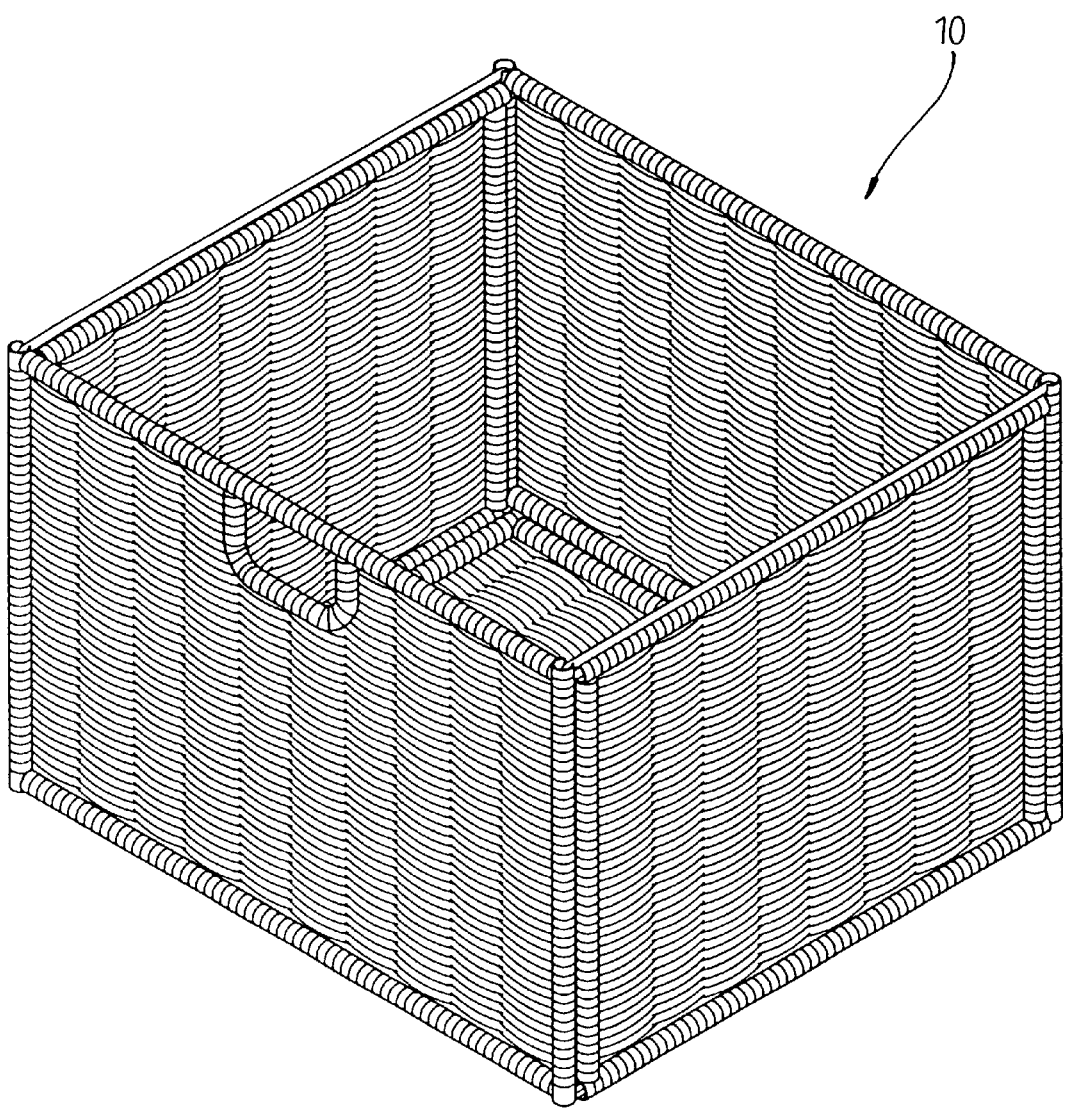
FIG. 7 is a perspective assembly view of a combinational drawer of a preferred embodiment in accordance with the present invention.

Referring to FIGS. 1 to 8, a combinational drawer 10 comprises a rectangular base frame 111, a first rectangular side frame 114 disposed on the rectangular base frame 111, a second rectangular side frame 113 disposed on the rectangular base frame 111, a first rectangular lateral frame 112 disposed on the rectangular base frame 111, a second rectangular lateral frame 115 disposed on the rectangular base frame 111, a first U-shaped rod 40 connected to the first rectangular side frame 114 and the second rectangular side frame 113, and a second U-shaped rod 400 connected to the first rectangular side frame 114 and the second rectangular side frame 113.

The second rectangular side frame 113 has a handle bar 23.

The first U-shaped rod 40 has a pair of first insertion ends 41.

The second U-shaped rod 400 has a pair of second insertion ends 410.

A base plate 12 encloses the rectangular base frame 111.

A first side plate 20 encloses the first rectangular side frame 114.

A second side plate 20a encloses the second rectangular side frame 1113.

A first lateral plate 13 encloses the first rectangular lateral frame 112.

A second lateral plate 13a encloses the second rectangular lateral frame 115.

The rectangular base frame 111 has a plurality of inner protrusions 14.

A connection fastener 30 has an L-shaped end 31 inserted in the first rectangular lateral frame 112, a distal end 310 inserted in the rectangular base frame 111, and a column 33 inserted in the first rectangular side frame 114.

A pair of protruded tips 32 are disposed on the distal end 310 of the connection fastener 30.

The first side plate 20 has four corner notches 21.

The first rectangular side frame 114 has a pair of positioning posts 22 inserted in the first rectangular lateral frame 112 and the second rectangular lateral frame 115.

Referring to FIG. 9, a fabric bag 50 surrounds the rectangular base frame 111, the first rectangular side frame 114, the second rectangular side frame 113, the first rectangular lateral frame 112, the second rectangular lateral frame 115, the first U-shaped rod 40, and the second U-shaped rod 400.

The invention is not limited to the above embodiment but various modification thereof may be made. Further, various changes in form and detail may be made without departing from thee scope of the invention.

I claim:

1. A combinational drawer comprising:
   a rectangular base frame,
   two rectangular side frames each mounted on the rectangular base frame,
   two rectangular lateral frames each mounted on the rectangular base frame,
   two U-shaped rods each connected to the two rectangular side frames, and
   a plurality of connection fasteners each having an L-shaped end inserted into a respective one of the two rectangular lateral frames, a distal end inserted into the rectangular base frame, and a bent column inserted into a respective one of the two rectangular side frames.

2. The combinational drawer as claimed in claim 1, wherein the rectangular base frame has an inner wall formed with two opposite protrusions, and the distal end of each of the connection fasteners has a periphery formed with two opposite protruded tips each locked on a respective one of the two protrusions of the rectangular base frame.

3. The combinational drawer as claimed in claim 1, wherein each of the two rectangular side frames is formed with a plurality of corner notches for receiving the column of each of the connection fasteners.

4. The combinational drawer as claimed in claim 1, wherein each of the two rectangular side frames has two positioning posts each inserted into a respective one of the two rectangular lateral frames.

* * * * *